United States Patent
Iwamura et al.

(10) Patent No.: US 10,613,001 B2
(45) Date of Patent: Apr. 7, 2020

(54) APPARATUS AND METHOD FOR MEASURING DIAMETRICAL STIFFNESS OF TREAD RING

(71) Applicant: Sumitomo Rubber Industries, Ltd., Kobe-shi, Hyogo (JP)

(72) Inventors: Wako Iwamura, Kobe (JP); Kiyotaka Nishio, Kobe (JP); Makoto Igarashi, Kobe (JP); Makoto Sugiya, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 109 days.

(21) Appl. No.: 15/793,103

(22) Filed: Oct. 25, 2017

(65) Prior Publication Data
US 2018/0136084 A1 May 17, 2018

(30) Foreign Application Priority Data

Nov. 15, 2016 (JP) .................. 2016-222635

(51) Int. Cl.
*G01M 17/02* (2006.01)
*B60C 7/10* (2006.01)
(Continued)

(52) U.S. Cl.
CPC ............. *G01M 17/02* (2013.01); *B29C 39/26* (2013.01); *B29D 30/02* (2013.01); *B60C 7/102* (2013.01); *B60C 11/04* (2013.01); *G01M 17/027* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 23/0493; B60C 23/04; B60C 2019/004; B60C 19/00; B60C 23/0498; B60C 23/0411; B60C 23/0496; B60C 23/064; B60C 23/0408; B60C 23/041; B60C 23/0488;
(Continued)

(56) References Cited

U.S. PATENT DOCUMENTS

2012/0291537 A1* 11/2012 Honda .................. G01M 17/02
73/146
2015/0352755 A1 12/2015 Kagota et al.
(Continued)

FOREIGN PATENT DOCUMENTS

JP 2015-123729 A 7/2015
JP 2015-231681 A 12/2015
RU 2499241 C1 * 11/2013

*Primary Examiner* — Andre J Allen
(74) *Attorney, Agent, or Firm* — Birch, Stewart, Kolasch & Birch, LLP

(57) ABSTRACT

An apparatus 1 for measuring a diametrical stiffness of a tread ring 100 for an airless tire 101 comprises: a device 2 for supporting the tread ring, a device 3 for applying a constant load F to the supported tread ring across the diameter of the tread ring, and a device 4 for measuring the amount of deflection of the tread ring across the above-said diameter caused by the applied load F.

13 Claims, 5 Drawing Sheets

(51) Int. Cl.
   *B29D 30/02* (2006.01)
   *B29C 39/26* (2006.01)
   *B60C 11/04* (2006.01)

(58) Field of Classification Search
   CPC ....... B60C 23/20; B60C 11/243; B60C 23/06;
   B60C 11/246; B60C 23/00; B60C
   23/0486; B60C 23/061; B60C 11/0083;
   B60C 13/003; B60C 2009/2038; B60C
   23/003; B60C 23/004; B60C 23/02; B60C
   23/0401; B60C 23/0416; B60C 23/0433;
   B60C 23/0447; B60C 23/0455; B60C
   23/0489; B60C 23/0491; B60C 23/066;
   B60C 25/002; B60C 25/005; B60C
   25/007; B60C 29/02; B60C 3/04; B60C
   99/00; B60C 99/006; B60C 11/24; B60C
   13/001; B60C 13/02; B60C 15/0036;
   B60C 17/02; B60C 2009/0071; B60C
   2009/2002; B60C 2200/02; B60C
   2200/06; B60C 2200/065; B60C 23/001;
   B60C 23/007; B60C 23/008; B60C
   23/0406; B60C 23/0413; B60C 23/0427;
   B60C 23/0454; B60C 23/0459; B60C
   23/0462; B60C 23/0467; B60C 23/0471;
   B60C 23/0472; B60C 23/0474; B60C
   23/0476; B60C 23/065; B60C 23/10;
   B60C 25/0548; B60C 25/056; B60C
   25/132; B60C 25/138; B60C 25/18; B60C
   29/005; B60C 9/005; B60C 9/18; B60C
   9/1807; B60C 9/20; B60C 9/28
   USPC .................................................. 73/146–146.8
   See application file for complete search history.

(56) References Cited

U.S. PATENT DOCUMENTS

2016/0266011 A1* 9/2016 Iwamura ................. B60C 19/00
2018/0093527 A1* 4/2018 Iwamura ................. B60B 9/26
2019/0061428 A1* 2/2019 Iwamura ................. B60C 7/143

* cited by examiner

APPARATUS AND METHOD FOR MEASURING DIAMETRICAL STIFFNESS OF TREAD RING

TECHNICAL FIELD

The present invention relates to an apparatus and a method for measuring a diametrical stiffness of a tread ring incorporated in an airless tire to form the tread of the tire.

BACKGROUND ART

The following Patent Document 1 discloses an airless tire, wherein a tread ring and a hub which are formed in advance are united with spokes during injection molding the spokes with a polymer material.

The following Patent Document 2 discloses an apparatus for measuring a stiffness of such a tread ring for airless tires, wherein a part in the circumferential direction of the tread ring corresponding to the ground contacting patch of the tire is pressed against a flat plate so as to be deformed, while the remaining part of the tread ring is supported not to be deformed, and the stiffness in the tire radial direction of the circumferential part is measured over the entire circumference by rotating the tread ring in order to check uniformity of the tread ring in the circumferential direction.

On the other hand, when such an airless tire is mounted on a vehicle, a load of the vehicle is applied to not only the lower part of the tread ring but also the upper part of the tread ring through the spokes, namely, the upper part is pulled down by the spokes.

Therefore, when assessing the tread ring for such airless tire, it is preferable to determine the diametrical stiffness of the tread ring alone rather the stiffness of a circumferential part. If the diametrical stiffness is low and the amount of deflection of the tire becomes too large, there is a possibility that the spokes are damaged. If the diametrical stiffness is high and the amount of the deflection is too small, the ride comfort is deteriorated.

Thus, in addition to the uniformity in the circumferential direction of the tread ring, the diametrical stiffness is an important factor for the tire performances.

Therefore, it is necessary to measure the diametrical stiffness of the tread ring alone so as to make the airless tire to be appropriately deflected.

PRIOR ART DOCUMENTS

Patent Document 1: Japanese Patent Application Publication No. 2015-231681
Patent Document 2: Japanese Patent Application Publication No. 2015-123729

SUMMARY OF THE INVENTION

It is therefore, an object of the present invention to provide an apparatus and a method for measuring a diametrical stiffness of a tread ring alone, by which the diametrical stiffness can be easily measured, for example, to help to predict the stiffness of the airless tire.

According to one aspect of the present invention, an apparatus for measuring a diametrical stiffness of a tread ring for an airless tire which comprises a hub to be fixed to an axle of a vehicle, the tread ring defining the tire tread and disposed radially outside the hub, and spokes extending radially from the hub to the tread ring to connect therebetween, comprises:

a support device for supporting the tread ring,
a load applying device for applying a constant load F to the supported tread ring across the diameter of the tread ring, and
a measuring device for measuring the amount of deflection of the tread ring across the above-said diameter caused by the applied load F.

It is preferable that the above-said support device comprises a support member for supporting the tread ring in its vertical position, the support member has a receiving surface on which the tread ring in its vertical position is put to support a lower end of the tread ring, and the receiving surface is curved along the tire tread.

It is preferable that, excepting the receiving surface, the support device does not contact with the tread ring.

It is preferable that the load applying device comprises a weight member to be placed on an upper end of the tread ring in its vertical position so that the constant load is applied to the tread ring across the diameter.

It is preferable that the load applying device comprises a weight receiving tray for supporting the weight member to be freely movable in the vertical direction.

According to another aspect of the present invention, a method for measuring a diametrical stiffness of a tread ring for an airless tire which comprises a hub to be fixed to an axle of a vehicle, the tread ring defining the tire tread and disposed radially outside the hub, and spokes extending radially from the hub to the tread ring to connect therebetween, comprises:

a load applying step of applying a constant load F to the tread ring across its diameter with the tread ring being supported by a support device, and
a deflection measuring step of measuring the amount of deflection of the tread ring across the above-said diameter caused by the applied load F.

It is preferable that, in the deflection measuring step, the amount of deflection is measured when a predetermined loading time Tm has elapsed from the application of the load F.

It is preferable that the predetermined loading time Tm is in a range from 2 to 200 seconds.

It is preferable that the load F is such that the amount hm of deflection measured when the predetermined loading time Tm has elapsed from the application of the load F falls within a range from 0.1% to 5.0% of the diameter Db of the tread ring measured when the load F is not yet applied.

It is preferable that the load F is such that the amount hm of deflection measured when the predetermined loading time Tm has elapsed from the application of the load F falls within a range from 0.2% to 3.0% of the diameter Db of the tread ring measured when the load F is not yet applied.

The method may further comprises a determination step of determining whether the tread ring is acceptable or not, based on a measurement result obtained by the deflection measuring step, wherein the measurement result includes, as a criterion, a ratio Da/Db of the diameter Da of the tread ring when the applied load F is removed to the diameter Db of the tread ring when the load F is not yet applied.

As described above, according to the present invention, it is possible to measure the amount of the diametrical deflection of the tread ring caused by the application of the constant load. Thus, the stiffness of the entire tread ring reflected by the actual usage can be obtained.

Therefore, the obtained result can be used in order to adjust the stiffness of a tread ring in an experimental before the tread ring is incorporated in the airless tire, and to reject an unacceptable tread ring from being incorporated in the airless tire, for example. Thus, the present invention is very useful in view of the development and productivity of the tread ring and airless tire.

DESCRIPTION OF THE PREFERRED EMBODIMENTS

Figure 1:
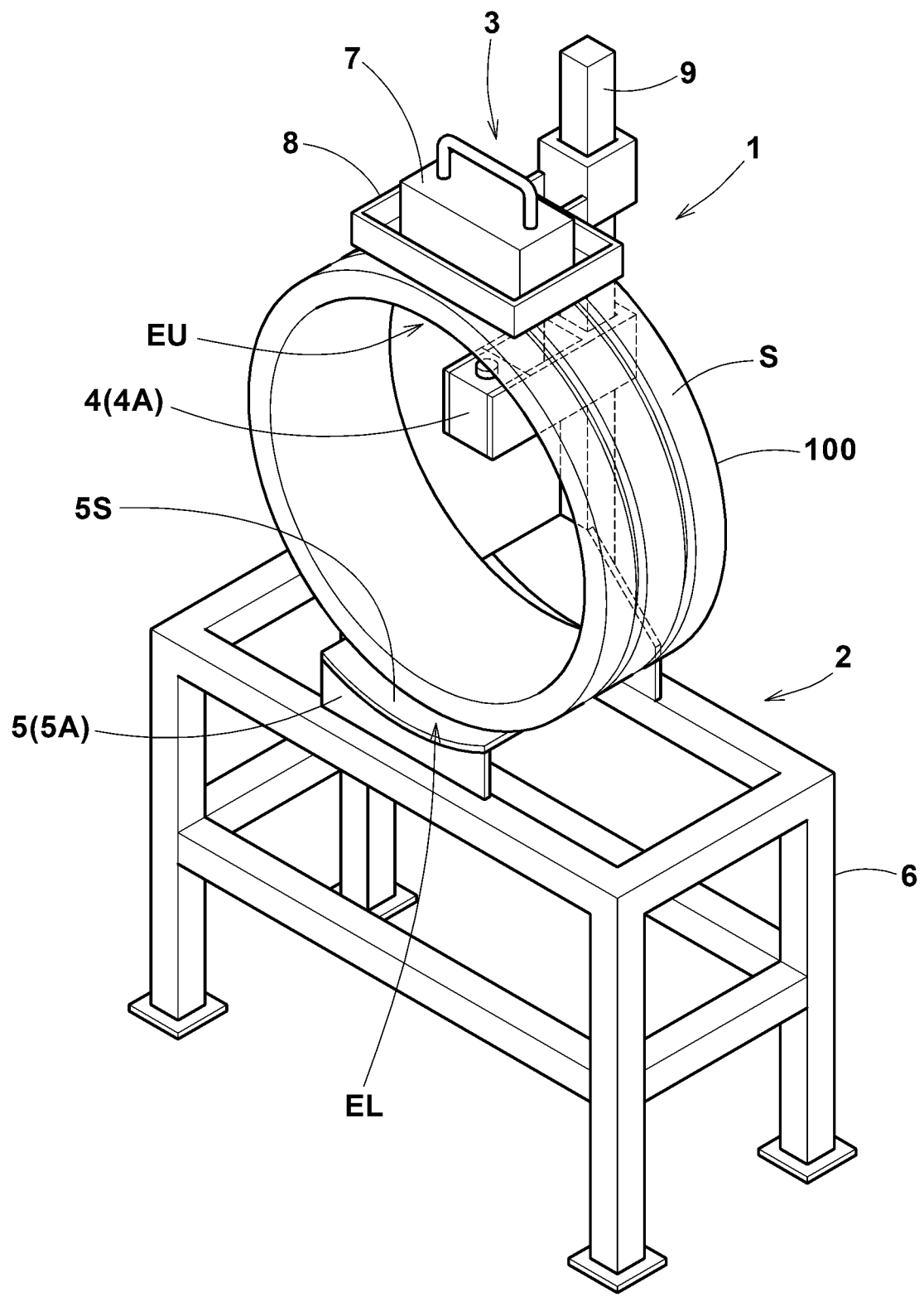
FIG. 1 is a perspective view of an apparatus for measuring a diametrical stiffness of a tread ring as an embodiment of the present invention.

Embodiments of the present invention will now be described in detail in conjunction with accompanying drawings.

In the drawings, apparatus 1 according to the present invention is for measuring a diametrical stiffness of a tread ring 100 alone.

Figure 5:
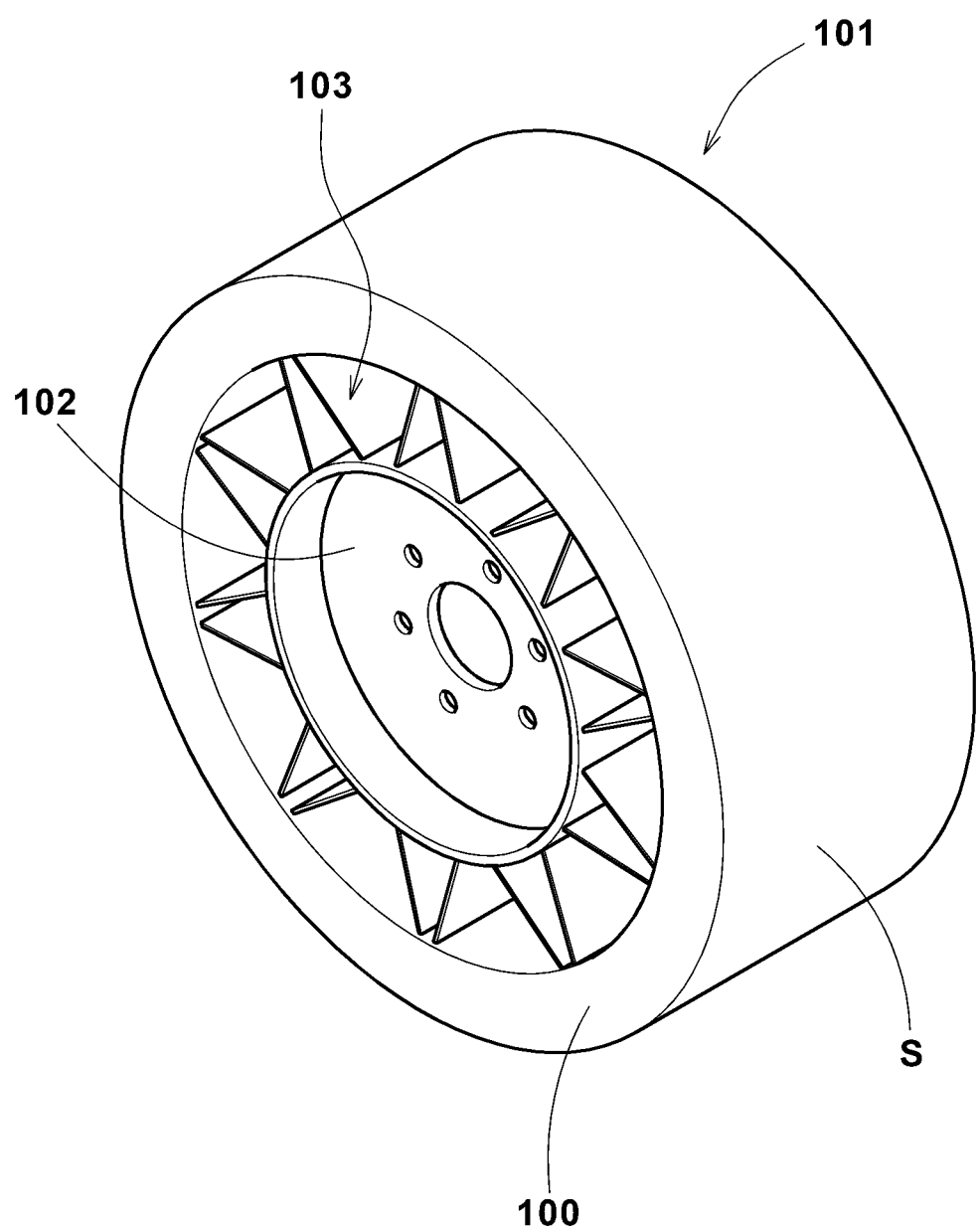
FIG. 5 is a perspective view of an airless tire in which the tread ring is incorporated.

The tread ring 100 is incorporated in an airless tire 101 as the radially outermost annular part to define the tread s of the tire as shown in FIG. 5.

The airless tire 101 comprises a hub 102 to be fixed to an axle of a vehicle, the tread ring 100 disposed radially outside the hub 102, and spokes 103 extending radially outwardly from the hub 102 to the tread ring 100 to connect therebetween.

The spokes 103 are made of a polymer material, e.g. urethane resin. For example, the spokes 103 are formed through an injection molding technique, inserting the preformed tread ring 100 and hub 102 in the mold, so that the spokes 103 are strongly united with the hub 102 and the tread ring 100.

The apparatus 1 comprises:
a support device 2 for supporting the tread ring 100,
a load applying device 3 for applying a constant load F to the supported tread ring 100 across the diameter, and
a measuring device 4 for measuring the amount h of deflection of the tread ring 100 in the diameter direction caused by the load F.

Figure 2:
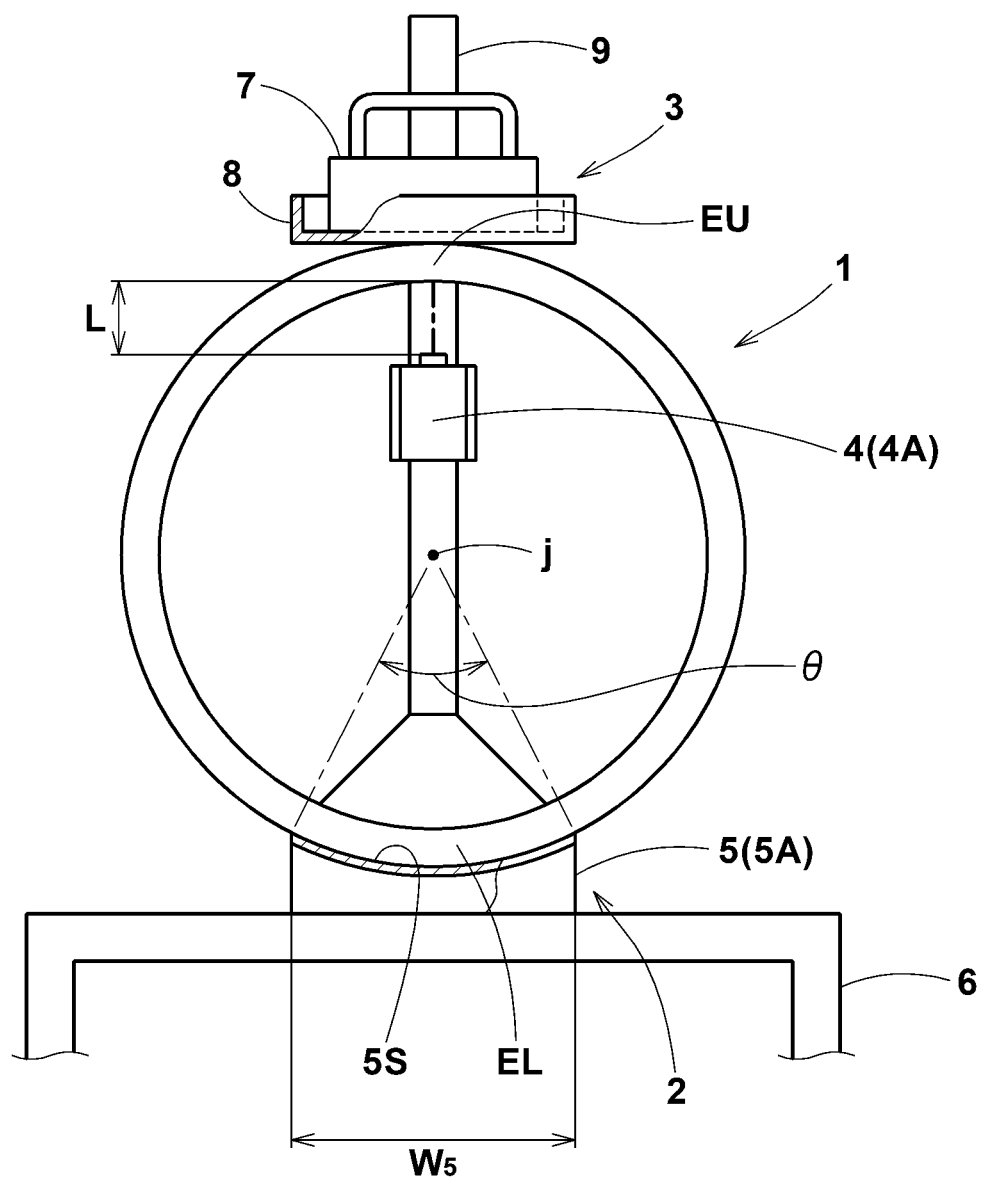
FIG. 2 is a front view of the apparatus showing a principal part thereof.
Figure 3:
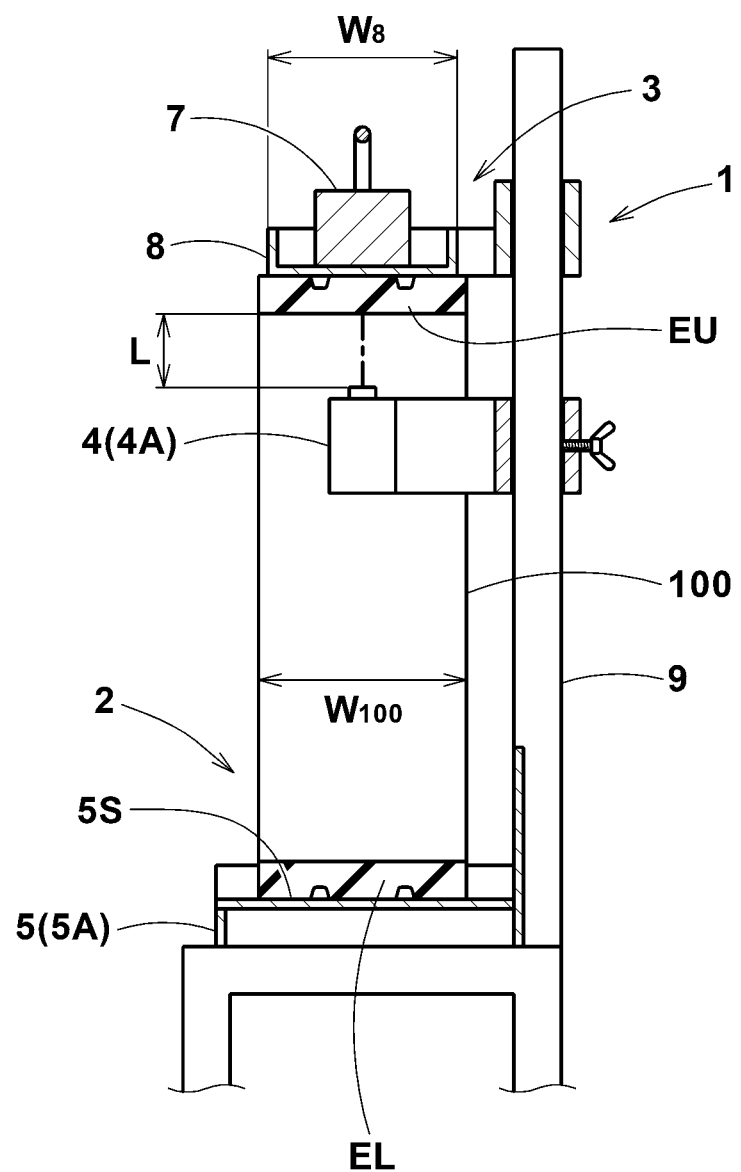
FIG. 3 is a cross-sectional view of the apparatus showing a principal part thereof.

As shown in FIGS. 1-3, the support device 2 comprises a support member 5 for supporting the tread ring 100 in its vertical position. The support member 5 is formed as a stage 5A attached to a table-like frame 6. The upper surface of the stage 5A defines a receiving surface 5S on which the tread ring 100 in its vertical position is put to support the lower end EL of the tread ring.

The receiving surface 5s is curved to accord with the curve of the tread s so that the tread ring 100 can be stably supported. If the circumferential dimension w5 of the receiving surface 5s is too large, it becomes difficult to accurately measure the diametrical stiffness. If too small, it becomes difficult to stably support the tread ring 100. Therefore, the circumferential dimension w5 is preferably not less that 5 degrees but not more than 30 degrees, more preferably not more than 20 degrees in terms of the central angle θ about the tire rotational axis as shown in FIG. 2.

Excepting the receiving surface 5S, the support device 2 does not contact with the tread ring 100.

The load applying device 3 comprises a weight member 7. The weight element 7 is placed on the upper end EU of the tread ring 100 so that a constant load F is vertically applied to the tread ring 100 across the diameter.

In this example, the weight element 7 is placed on the upper end EU through a weight receiving tray 8.

The weight receiving tray 8 has a horizontal under surface to contact with the upper end EU of the tread ring 100.

The weight receiving tray 8 is supported by a post 9 rising from the above-mentioned frame 6 so as to be movable in the vertical direction while keeping the under surface horizontal. Therefore, by putting the weight element 7 on the weight receiving tray 8, the weight receiving tray 8 is moved downward by its weight, and contacts with the upper end EU of the tread ring 100 to apply the constant load F in the diameter direction.

The width w8 in the tire axial direction of the under surface of the weight receiving tray 8 is preferably 20% or more of the axial width w100 of the tread ring 100.

The measuring device 4 comprises a non-contact type displacement sensor 4A such as a laser displacement gauge. In the present embodiment, the displacement sensor 4A is disposed underside of the upper end EU and fixed to the post 9. The displacement sensor 4A measures a distance L to the inner circumferential surface of the upper end EU of the tread ring 100 along the diameter of the tread ring 100.

Therefore, the amount h of the diametrical deflection of the tread ring 100 across the diameter direction when the load F is applied can be obtained as the difference between the distance L when the load F is applied and the distance L when no load is applied. Incidentally, various non-contact type displacement sensors, for example, ultrasonic type sensor may be employed.

Therefore, the diametrical stiffness can be readily obtained from the load F and the deflection amount h, as F/h. In the apparatus 1, as the tread ring 100 is supported in only the lower end EL by simply putting it on the receiving surface 5s, the measured tread ring 100 can be easily replaced by new one to be measured, therefore, the measuring efficiency is increased.

Further, as the weight member 7 is used in the load applying device 3, it is possible to readily and accurately apply the constant load F.

Furthermore, as the support device 2 does not contact with the tread ring 100 except for the receiving surface 5S, it allows the tread ring 100 to accurately cause a flexural deformation, and the measurement accuracy is improved.

Therefore, for a number of the tread rings 100 for example manufactured in the same lot, the stiffness of the tread ring 100 can be measured accurately and quickly, and it is possible to determine whether the stiffness of the tread ring 100 is acceptable or not on the basis of the measurement result. In the same lot, it is possible to determine on the basis of the amount h of the deflection, the deflection ratio h/Db, the ratio h/F of the amount h of deflection to the load F, and the ratio (h/Db)/F of the deflection ratio h/Db to the load F, for example. Here, Db is, as mentioned above, the diameter of the tread ring when the load F is not yet applied.

If the tread ring 100 is determined as being acceptable, the tread ring 100 is conveyed to a next process (e.g., for injection molding the spokes so that the spokes are integrated with the tread ring and the hub inserted in the mold).

If the tread ring 100 is determined as being not acceptable, the tread ring 100 is conveyed to another process (e.g., for adjusting the stiffness, or destroying the tread ring 100).

Next, a method for measuring a diametrical stiffness of a tread ring by the use of the apparatus 1 according to the present invention will be described.

The method comprises a load applying step and a deflection measuring step.

In the load applying step, as shown in FIGS. 1 to 3, the tread ring 100 supported by the support device 2 is loaded with a constant load F in the diameter direction by the load applying device 3.

Figure 4:
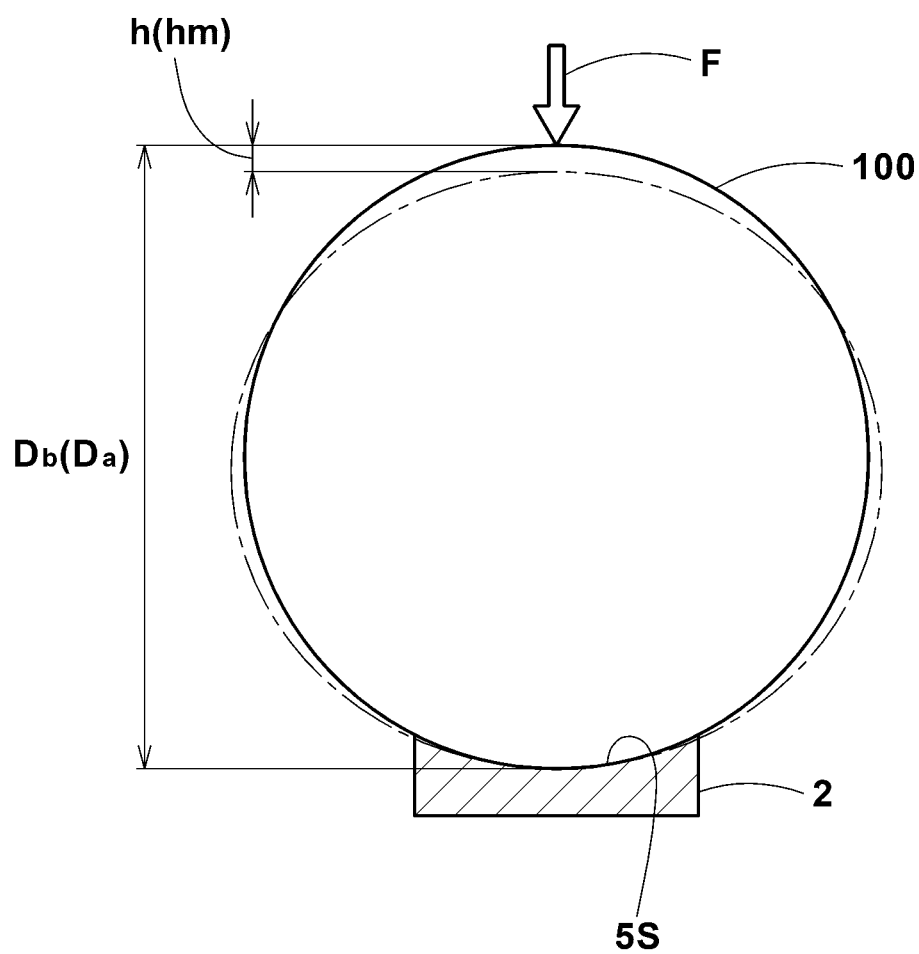
FIG. 4 is a diagram showing a diametrical deflection of the tread ring which is caused in a load applying step.

In the deflection measuring step, by the use of the measuring device 4, the tread ring 100 applied by the load F is measured for the amount h of its deflection across the diameter in the load applying direction (vertical direction in the figure) as shown in FIG. 4.

In FIG. 4, the tread ring 100 is diagrammatically illustrated by omitting the thickness of the tread ring 100.

The tread ring 100 has a tendency that, when the constant load F is applied, the amount h of the deflection gradually increases as time passes, while gradually decreasing the increasing rate, and the amount h converges to a certain value.

Therefore, in the deflection measuring step in the present embodiment, there is measured an amount hm of the deflection when a predetermined loading time Tm has elapsed from the application of the load F.

When comparing different tread rings, their deflections should be measured when the same time (predetermined loading time Tm) has elapsed from the application of the load F.

Such predetermined loading time Tm is preferably not less than 2 seconds, more preferably not less than 15 seconds, but preferably not more than 200 seconds, more preferably not more than 90 seconds.

If less than 2 seconds, as the above-mentioned increasing rate is still high, the variation in the measured values is liable to increase. If more than 200 seconds, the measurement efficiency is decreased.

It is preferable to set the load F to such values that the amount hm of the deflection becomes in a range from 0.1% to 5.0% of the diameter Db, more preferably in a range from 0.2% to 3.0% of the diameter Db of the tread ring when the load F is not yet applied. If the load F is too large and the amount hm is more than 5.0%, the residual strain increases, and the uniformity of the tread ring 100 is deteriorated. If the load F is too small and the amount hm is less than 0.1%, the measurement accuracy is lowered.

In this embodiment, the method for measuring the diametrical stiffness of the tread ring further comprises a determination step of determining whether the tread ring 100 is acceptable or not, based on the measurement result obtained by the deflection measuring step.

The determination step in this example includes a first determination step and a second determination step.

In the first determination step, whether the tread ring 100 is acceptable or not is determined based on a first criterion which is a stiffness evaluated from, for example, the amount hm of the deflection, the ratio hm/Db of the deflection to the diameter, the ratio hm/F of the deflection to the load, and/or the ratio (hm/Db)/F of the ratio hm/Db to the load F etc.

In the second determination step, whether the tread ring 100 is acceptable or not is determined based on a second criterion which is the ratio Da/Db of the diameter Da of the tread ring measured when the applied load F is removed to the diameter Db of the tread ring measured when the load F is not yet applied. The second criterion is for the uniformity of the tread ring 100, wherein the smaller the ratio Da/Db, the better the uniformity. Preferably, 99.7% is used as the threshold value of the second criterion.

While detailed description has been made of especially preferable embodiments of the present invention, the present invention can be embodied in various forms without being limited to the illustrated embodiment.

For example, the apparatus for measuring a diametrical stiffness of a tread ring can be configured such that the support device 2 supports the tread ring 100 in its horizontal position, the load applying device 3 applies the constant load F horizontally to the tread ring 100 in its horizontal position across the diameter, and the measuring device 4 measures the amount of deflection of the tread ring across the above-said diameter.

Confirmation Test

Using tread rings manufactured in the same lot, the diametrical stiffness was measured with the above described apparatus shown in FIGS. 1-3.

Firstly, under such a condition that only the loading time Tm was changed, the amount hm of the diametrical stiffness when the predetermined loading time Tm had elapsed from the application of the load F was measured.

The results are shown in Table 1.

As shown in Table 1, the deflection amount hm tends to increase as time passes, and the increasing rate is higher when the elapsed time is lesser. As shown, it is preferred that the predetermined loading time Tm is 2.0 seconds (Example 3) or more, preferably 3.0 seconds (Example 2) or more, more preferably 15 seconds (Example 1) or more.

If the predetermined loading time Tm is too long as in Example 7, the ratio Da/Db decreases, namely, it becomes hard for the tread ring to restore its original shape when the load is removed.

As a result, the uniformity of the airless tire manufactured by using such tread ring is liable to be lowered.

TABLE 1

| Condition | Ex1 | Ex2 | Ex3 | Ex4 | Ex5 | Ex6 | Ex7 |
|---|---|---|---|---|---|---|---|
| load F (kg) | 3.5 | 3.5 | 3.5 | 3.5 | 3.5 | 3.5 | 3.5 |
| loading time Tm (sec.) | 15 | 3 | 2 | 1 | 150 | 200 | 240 |
| deflection amount hm (mm) | 2.0 | 1.5 | 0.8 | 0.7 | 3.0 | 4.0 | 5.0 |
| diameter Db (mm) | 535 | 535 | 535 | 535 | 535 | 535 | 535 |
| hm/Db (%) | 0.3738 | 0.2804 | 0.1408 | 0.1308 | 0.5607 | 0.7477 | 0.93458 |
| Da/Db (%) | 99.9065 | 99.9626 | 100 | 100 | 99.8131 | 99.8131 | 99.71963 |

Secondly, under such a condition that only the load F was changed to change the deflection amount hm as shown in Table 2, the amount hm of the diametrical stiffness when 15 seconds had elapsed from the application of the load F was measured.

The results are shown in Table 2.

As shown in Table 2, when the load F is too large and thus the amount hm of the diametrical stiffness is too large as in Example 16, the ratio Da/Db decreases, namely, it becomes hard for the tread ring to restore its original shape when the load is removed. As a result, the uniformity of the airless tire manufactured by using such tread ring is liable to be lowered. when the load F is too small and thus the amount hm of the diametrical stiffness is too small in Examples 11 and 12, there is a possibility that the measurement accuracy becomes low.

TABLE 2

| Condition | Ex9 | Ex10 | Ex11 | Ex12 | Ex13 | Ex14 | Ex15 | Ex16 |
|---|---|---|---|---|---|---|---|---|
| loading time Tm (sec.) | 15 | 15 | 15 | 15 | 15 | 15 | 15 | 15 |
| deflection amount hm (mm) | 1.3 | 1.07 | 0.535 | 0.3 | 12 | 16.05 | 26.75 | 30 |
| diameter Db (mm) | 535 | 535 | 535 | 535 | 535 | 535 | 535 | 535 |
| hm/Db (%) | 0.24299 | 0.2 | 0.1 | 0.0561 | 2.243 | 3 | 5 | 5.6075 |
| Da/Db (%) | 100 | 100 | 100 | 100 | 100 | 99.8393 | 99.71963 | 99.0654 |

DESCRIPTION OF THE REFERENCE SIGNS 1 apparatus for measuring a diametrical stiffness of a tread ring
2 support device
3 load applying device
4 measuring device
5 support for tread ring
5s receiving surface
7 weight member
100 tread ring
101 airless tire
102 Hub
103 spoke
s tire tread

The invention claimed is:

1. An apparatus for measuring a diametrical stiffness of a tread ring for an airless tire which comprises a hub to be fixed to an axle of a vehicle, the tread ring disposed radially outside the hub and defining a tire tread, and spokes extending radially from the hub to the tread ring to connect therebetween, comprising:
a support device for supporting the tread ring,
a load applying device for applying a constant load F to the supported tread ring across a diameter of the tread ring, and
a measuring device for measuring an amount of deflection of the tread ring across said diameter caused by the applied load F,
wherein the support device supports the tread ring so that the whole of the tread ring deflects in the diametrical direction, and the support device does not include a restraint portion restraining a part of the tread ring in a non-deformable manner.

2. The apparatus according to claim 1, wherein
the support device comprises a support member for supporting the tread ring in its vertical position,
the support member has a receiving surface on which the tread ring in its vertical position is put to support a lower end of the tread ring, and
the receiving surface is curved to accord with the tire tread.

3. The apparatus according to claim 2, wherein
the support device does not contact with the tread ring, excepting the receiving surface.

4. The apparatus according to claim 2, wherein
the load applying device comprises a weight member to be placed on an upper end of the tread ring in its vertical position so that the constant load is applied to the tread ring across the diameter.

5. The apparatus according to claim 4, wherein
the load applying device comprises a weight receiving tray for supporting the weight member to be freely movable in the vertical direction.

6. A method for measuring a diametrical stiffness of a tread ring for an airless tire which comprises a hub to be fixed to an axle of a vehicle, the tread ring disposed radially outside the hub and defining the tire tread, and spokes extending radially from the hub to the tread ring to connect therebetween,
comprising:
a load applying step of applying a constant load F to the tread ring across its diameter with the tread ring being supported by a support device, and
a deflection measuring step of measuring the amount of deflection of the tread ring across the above-said diameter caused by the applied load F,
wherein the support device supports the tread ring so that the whole of the tread ring deflects in the diametrical direction, and the support device does not include a restraint portion restraining a part of the tread ring in a non-deformable manner.

7. The method according to claim 6, wherein
in the deflection measuring step, the amount of deflection is measured when a predetermined loading time Tm has elapsed from the application of the load F.

8. The method according to claim 7, wherein
the predetermined loading time Tm is in a range from 2 to 200 seconds.

9. The method according to claim 7, wherein
the load F is such that the amount hm of deflection measured when the predetermined loading time Tm has elapsed from the application of the load F falls within a range from 0.1% to 5.0% of the diameter Db of the tread ring measured when the load F is not yet applied.

10. The method according to claim 7, wherein
the load F is such that the amount hm of deflection measured when the predetermined loading time Tm has elapsed from the application of the load F falls within a range from 0.2% to 3.0% of the diameter Db of the tread ring measured when the load F is not yet applied.

11. The method according to claim 6, which further comprises:
a determination step of determining whether the tread ring is acceptable or not, based on a measurement result obtained by the deflection measuring step, wherein
the measurement result includes, as a criterion, a ratio Da/Db of the diameter Da of the tread ring when the applied load F is removed to the diameter Db of the tread ring when the load F is not yet applied.

12. The apparatus according to claim 2, wherein a radius of the receiving surface is larger than a radius of the tire tread.

13. The apparatus according to claim 2, wherein a circumferential dimension of the receiving surface is from 5 degrees to 30 degrees in terms of the central angle θ about the tire rotational axis.

* * * * *